(12) United States Patent
Forster

(10) Patent No.: US 12,129,039 B2
(45) Date of Patent: Oct. 29, 2024

(54) ELECTRIC PROPULSION SYSTEM OF AN AIRCRAFT

(71) Applicant: Airbus SAS, Blagnac (FR)

(72) Inventor: Richard Forster, Blagnac (FR)

(73) Assignee: Airbus SAS, Blagnac (FR)

( * ) Notice: Subject to any disclaimer, the term of this patent is extended or adjusted under 35 U.S.C. 154(b) by 41 days.

(21) Appl. No.: 17/535,047

(22) Filed: Nov. 24, 2021

(65) Prior Publication Data

US 2022/0177146 A1 Jun. 9, 2022

(30) Foreign Application Priority Data

Dec. 3, 2020 (FR) .................................... 2012610

(51) Int. Cl.
| | | |
|---|---|---|
| *B64D 33/08* | (2006.01) | |
| *B64D 27/24* | (2006.01) | |
| *F02G 1/043* | (2006.01) | |
| B64D 27/02 | (2006.01) | |
| B64D 41/00 | (2006.01) | |

(52) U.S. Cl.
CPC ............. *B64D 27/24* (2013.01); *B64D 33/08* (2013.01); *F02G 1/0435* (2013.01); *B64D 27/026* (2024.01); *B64D 2041/005* (2013.01); *F02G 2243/54* (2013.01)

(58) Field of Classification Search
CPC .... F02C 7/18; F02C 7/185; F02C 7/32; F02C 7/36; F01N 5/02; F01N 5/025; F02G 2243/54; F05D 2260/211
See application file for complete search history.

(56) References Cited

U.S. PATENT DOCUMENTS

| | | | | |
|---|---|---|---|---|
| 10,495,355 | B2* | 12/2019 | Fukaya | ................. F03G 7/0252 |
| 10,507,934 | B1 | 12/2019 | Dyson et al. | |
| 2003/0196441 | A1* | 10/2003 | Swift | ...................... F25B 9/145 |
| | | | | 62/6 |
| 2003/0205641 | A1 | 11/2003 | McElroy et al. | |
| 2011/0155508 | A1* | 6/2011 | Glahn | ....................... F16N 7/40 |
| | | | | 184/6.11 |
| 2011/0162827 | A1* | 7/2011 | Riley | .................... F28D 9/0075 |
| | | | | 165/172 |
| 2016/0177802 | A1* | 6/2016 | Courtes | ..................... F01P 3/20 |
| | | | | 60/685 |
| 2017/0045272 | A1* | 2/2017 | Bandhauer | .............. F01K 11/02 |

(Continued)

FOREIGN PATENT DOCUMENTS

| | | |
|---|---|---|
| EP | 3199791 A1 | 8/2017 |
| FR | 3032749 A1 | 8/2016 |

(Continued)

OTHER PUBLICATIONS

French Search Report; priority document.

*Primary Examiner* — Thuyhang N Nguyen
(74) *Attorney, Agent, or Firm* — Greer, Burns & Crain, Ltd.

(57) ABSTRACT

An electric propulsion system of an aircraft includes an electrical generator and a cooling device of the electrical generator. It further includes at least one thermoacoustic engine and a heat transfer circuit configured to transport heat dissipated by the electrical generator to the thermoacoustic engine. The cooling device of the electrical generator is at least partially powered by energy from the thermoacoustic engine.

12 Claims, 4 Drawing Sheets

(56) References Cited

U.S. PATENT DOCUMENTS

| | | | |
|---|---|---|---|
| 2017/0133695 A1* | 5/2017 | Jung | G01N 27/409 |
| 2017/0211474 A1 | 7/2017 | Sennoun | |
| 2018/0066584 A1* | 3/2018 | Twelves | F01D 25/12 |
| 2018/0363564 A1 | 12/2018 | Geneste | |
| 2019/0145273 A1* | 5/2019 | Frank | F01D 15/10 |
| | | | 244/53 R |
| 2019/0178111 A1* | 6/2019 | Uechi | F01K 23/106 |

FOREIGN PATENT DOCUMENTS

| | | |
|---|---|---|
| FR | 3044714 A1 | 6/2017 |
| JP | 2014223959 A | 12/2014 |
| JP | 2020009615 A | 1/2020 |

* cited by examiner

ELECTRIC PROPULSION SYSTEM OF AN AIRCRAFT

CROSS-REFERENCES TO RELATED APPLICATIONS

This application claims the benefit of the French patent application No. 2012610 filed on Dec. 3, 2020, the entire disclosures of which are incorporated herein by way of reference.

FIELD OF THE INVENTION

The invention relates to the field of aircraft comprising an electric propulsion system.

BACKGROUND OF THE INVENTION

Such a propulsion system comprises an electrical generator. According to different variants, the electrical generator comprises an alternator coupled to a heat engine, a set of electrical batteries or even a set of fuel cells. The electrical generator generally uses power electronic components, for example to convert voltage levels of an electrical current produced by this generator. These electronic components dissipate a significant quantity of heat. The result thereof is that it is necessary to cool these electronic components by means of a cooling device in order to allow them to operate correctly. However, the cooling device has to be supplied with energy to allow it to operate. In order to improve the performance levels of the propulsion system, it would be desirable to reduce the quantity of energy that has to be supplied to the cooling device. Similarly, when the electrical generator uses a set of fuel cells, these fuel cells dissipate a significant quantity of heat. A cooling circuit, containing a coolant, is associated with them to discharge this heat. As is known, the coolant is itself cooled in a heat exchanger implanted in a "Ram Air" line supplied with air outside the aircraft when the latter is in flight. In certain phases of use of the aircraft, in particular when it is on the ground or in a take-off phase, the cooling of the coolant by means of the heat exchanger may not be sufficient to discharge all the heat dissipated by the fuel cells. It would be desirable to find a complementary solution for discharging a portion of the heat dissipated by the fuel cells.

SUMMARY OF THE INVENTION

An aim of the present invention is notably to provide a solution to this problem. It relates to an electric propulsion system of an aircraft comprising an electrical generator dissipating heat in its operation, and a cooling device of the electrical generator. The electric propulsion system is noteworthy in that it further comprises at least one thermoacoustic engine and a heat transfer circuit configured to transfer heat dissipated by the electrical generator to the thermoacoustic engine, and in that the cooling device of the electrical generator is at least partially powered by energy from the thermoacoustic engine.

Thus, by virtue of the invention, the cooling device of the electrical generator is powered, at least partly, by energy produced by the thermoacoustic engine by using a portion of the heat dissipated by the electrical generator. The system according to the invention makes a twofold contribution to the cooling of the electrical generator. A first contribution corresponds to the heat transferred from the electrical generator to the thermoacoustic engine by the heat transfer circuit. A second contribution corresponds to the cooling of the electrical generator by the cooling device at least partially powered using energy from the thermoacoustic engine, this energy corresponding to heat that is sought to be discharged. That makes it possible to cool the electrical generator autonomously or at least partly autonomously.

Advantageously, the thermoacoustic engine is a travelling wave thermoacoustic engine.

According to a first alternative, the cooling device of the electrical generator is mechanically coupled to the at least one thermoacoustic engine.

According to a second alternative, the at least one thermoacoustic engine drives an alternator provided to at least partially electrically power the cooling device of the electrical generator.

In a particular embodiment, the cooling device of the electrical generator comprises a two-phase device comprising a compressor that is at least partially powered by energy from the thermoacoustic engine.

In one embodiment, the electric propulsion system comprises at least two, preferably four, thermoacoustic engines whose thermoacoustic cores are acoustically mounted in series so as to drive a set of bidirectional turbines.

In another embodiment, the electric propulsion system comprises four thermoacoustic engines whose thermoacoustic cores are acoustically mounted in series pairwise in a so-called push-pull configuration so as to drive a single bidirectional turbine.

In a particular embodiment, the cooling device is configured to cool power electronic components of the electrical generator.

In another particular embodiment, the electrical generator comprises a set of fuel cells and a cooling circuit of the fuel cells, the cooling circuit containing a coolant, and the cooling device is configured to cool the coolant.

The invention also relates to an aircraft comprising such an electric propulsion system.

BRIEF DESCRIPTION OF THE DRAWINGS

The invention will be better understood on reading the following description and studying the attached figures.

DETAILED DESCRIPTION OF THE PREFERRED EMBODIMENTS

Figure 1:
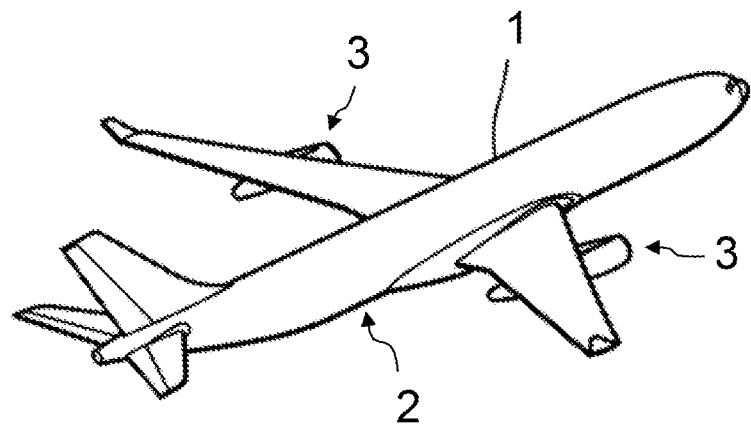
FIG. 1 illustrates an aircraft comprising an electric propulsion system.
Figure 2:
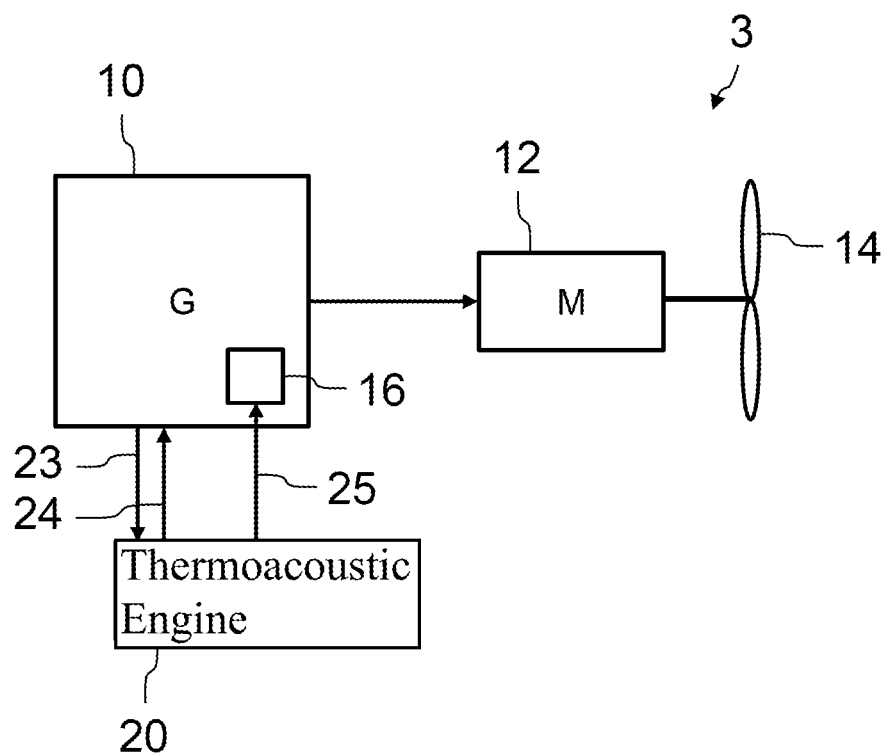
FIG. 2 schematically illustrates an electric propulsion system according to an embodiment of the invention.

The aircraft 1 represented in FIG. 1 comprises a fuselage 2 and electric propulsion systems 3, for example attached to wings fixed to the fuselage. As represented in FIG. 2, an electric propulsion system 3 according to an embodiment of the invention, comprises an electrical generator 10 (labelled "G" in the figure) linked electrically to an electric motor 12 (labelled "M" in the figure), and a propeller 14. The propeller 14 is coupled mechanically to the electric motor 12, directly or indirectly, for example via a gearbox. The electrical generator 10 comprises a cooling device 16. The electric propulsion system 3 further comprises a thermoacoustic engine 20, linked to the electrical generator 10 by a heat transfer circuit comprising a go duct 23 from the electrical generator 10 to the thermoacoustic engine 20 and a return duct 24 from the thermoacoustic engine 20 to the electrical generator 10. The heat transfer circuit is configured to make it possible to transfer heat from a source of heat (for example, power electronic components or a set of fuel cells) of the electrical generator 10 to the thermoacoustic engine 20. The thermoacoustic engine 20 is also linked to the cooling device 16 by a link 25.

Figure 3:
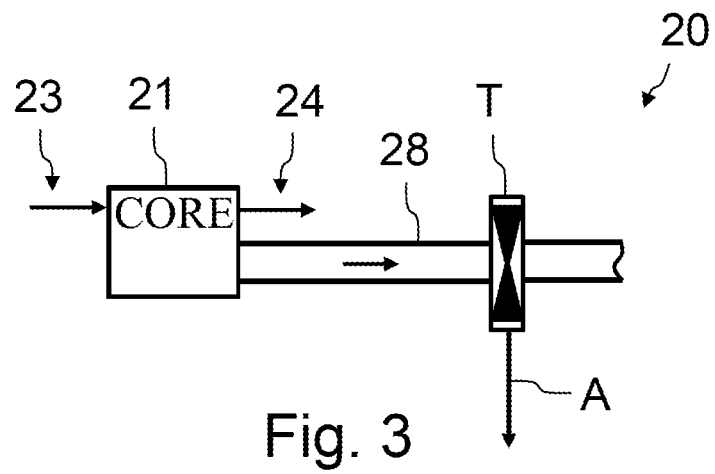
FIG. 3 schematically illustrates a thermoacoustic engine of the electric propulsion system represented in FIG. 2.

In an embodiment illustrated by FIG. 3, the thermoacoustic engine 20 comprises a thermoacoustic core 21 linked at the input to the go duct 23 of the heat transfer circuit and linked at the output to the return duct 24 of the heat transfer circuit. The thermoacoustic core 21 is also linked to an acoustic duct 28 on which there is installed a turbine T comprising an output shaft A. Advantageously, the turbine T is a bidirectional turbine.

In operation, when the electrical generator 10 produces electricity to power the electric motor 12 driving the propeller 14, the electrical generator 10 also dissipates heat. This heat is dissipated by a heat source corresponding, in particular, to power electronic components and/or to a set of fuel cells, as indicated previously. The duct 23 of the heat transfer circuit contains a heat transfer fluid which makes it possible to transfer heat dissipated by the electrical generator to the thermoacoustic engine 20. The heat transfer fluid thus arrives at the input of thermoacoustic core 21, at an input temperature dependent on the heat dissipated by the electrical generator 10. The heat transfer fluid re-emerges from the thermoacoustic core 21 at an output temperature lower than the input temperature and it is returned to the electrical generator 10 by means of the return duct 24 of the heat transfer circuit. The temperature difference between the input temperature and the output temperature of the thermoacoustic core corresponds to heat transmitted from the electrical generator 10 to the thermoacoustic core 21. This heat corresponds to a first portion of the heat dissipated by the electrical generator 10, which is thus discharged from the electrical generator 10. That represents a first contribution to the cooling of the electrical generator 10. Also, the heat transmitted to the thermoacoustic core 21 allows its operation, that is to say, the transmission of acoustic waves in the acoustic duct 28. In FIG. 3, the acoustic waves are illustrated by an arrow in the acoustic duct 28. These acoustic waves arrive on the blades of the turbine T, which has the effect of driving a rotation of the turbine and therefore a rotation of the output shaft A of the turbine. The rotation of the output shaft A of the turbine is used to power the cooling device 16 of the electrical generator 10, via the link 25. When the turbine T is bidirectional, it is driven in rotation both by acoustic waves being propagated from the thermoacoustic core 21 to the turbine T (from left to right in FIG. 2) and by acoustic waves being propagated from the turbine T to the thermoacoustic core 21 (from right to left in FIG. 2). The operation of the cooling device 16 makes it possible to cool the electrical generator 10 and therefore discharge a second portion of the heat dissipated by the electrical generator 10. That represents a second contribution to the cooling of the electrical generator 10. The first and second contributions to the cooling of the electrical generator thus make it possible to cool the electrical generator 10 autonomously or at least partly autonomously.

The cooling of the electrical generator 10 by the cooling device 16 corresponds, for example, to a cooling of power electronic components of the electrical generator 10 or to a cooling of a set of fuel cells of the electrical generator 10. In this second case, the cooling device 16 is, for example, configured so as to cool a coolant contained in a cooling circuit of the set of fuel cells.

According to a first alternative, the link 25 corresponds to a mechanical coupling of the cooling device 16 to the output shaft A of the turbine T of the thermoacoustic engine 20.

According to a second alternative, an alternator 32 is mechanically coupled to the output shaft A of the turbine T. The link 25 then corresponds to a set of electrical cables making it possible to electrically power the cooling device 16.

Figure 4:
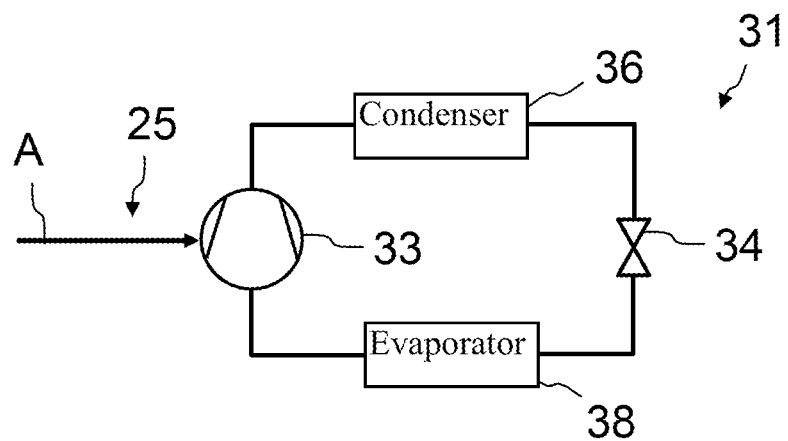
FIG. 4 schematically illustrates an embodiment of a cooling device of an electrical generator of the electric propulsion system represented in FIG. 2.
Figure 5:
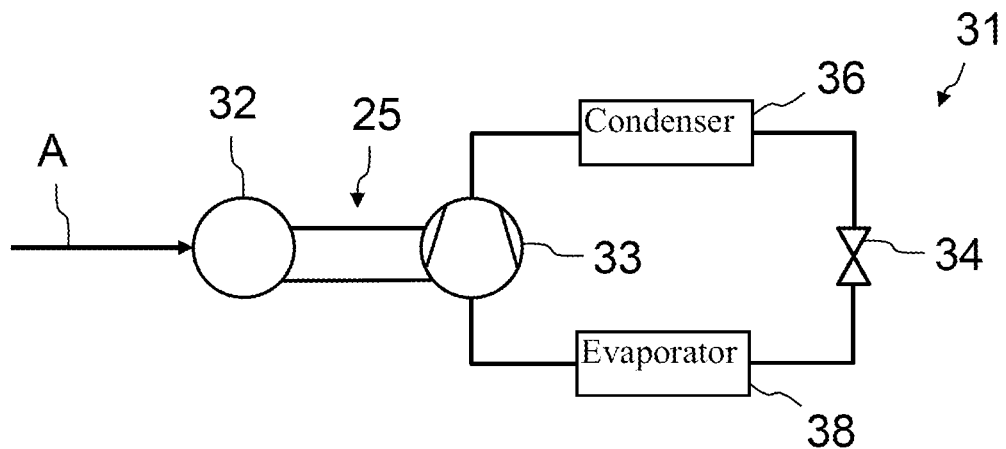
FIG. 5 schematically illustrates another embodiment of the cooling device of the electrical generator of the electric propulsion system represented in FIG. 2.

In a particular embodiment, the cooling device 16 comprises a two-phase device 31 comprising a compressor 33, as represented in FIGS. 4 and 5. Conventionally, the two-phase circuit further comprises a condenser 36, an expansion valve 34 and an evaporator 38. In the case of the first alternative, the compressor 33 is mechanically coupled to the output shaft A of the turbine T, as represented in FIG. 4. The rotation of the output shaft A then drives the operation of the compressor. In the case of the second alternative, the compressor 33 is linked to the alternator 32 by means of a set of electrical cables, as represented in FIG. 5. A rotation of the output shaft A of the turbine then drives the alternator 32 which supplies electricity to the compressor 33, thus allowing it to operate.

Within the framework of the invention, the thermoacoustic engine 20 wholly or partly powers the cooling device 16. When the thermoacoustic engine 20 only partly powers the cooling device 16, the cooling device 16 is also powered by another source of energy of the aircraft, such as, for example, a source of mechanical energy or a source of electrical energy. Thus, in the particular embodiment in which the cooling device 16 comprises the two-phase device 31, this two-phase device 31 comprises, for example, a second compressor mounted in parallel or in series with the compressor 33, this second compressor being powered by this other source of energy.

According to a first variant, the thermoacoustic engine 20 is a standing wave thermoacoustic engine.

According to a preferred second variant, the thermoacoustic engine 20 is a travelling wave thermoacoustic engine.

Advantageously, the electric propulsion system 3 comprises at least two thermoacoustic engines mounted acoustically in series and driving a set of bidirectional turbines. Thus, in an embodiment illustrated in FIG. 6, the electric propulsion system 3 comprises four thermoacoustic engines mounted acoustically in series and driving four turbines, preferably bidirectional turbines. More particularly, the thermoacoustic cores 21a, 21b, 21c, 21d of the four thermoacoustic engines are mounted in series on an acoustic duct 28 forming a closed loop. The four turbines T1, T2, T3, T4 are also mounted in series on the acoustic duct 28, each being inserted between two consecutive acoustic cores. The respective output shafts A1, A2, A3, A4 of the four turbines are mechanically coupled to a gearbox 30 which comprises an output shaft which is not represented in the figure. The thermoacoustic cores 21a, 21b, 21c, 21d are linked respectively at the input to ducts 23a, 23b, 23c, 23d of heat transfer circuits. The thermoacoustic cores 21a, 21b, 21c, 21d are also linked respectively at the output to ducts 24a, 24b, 24c, 24d of the heat transfer circuits. According to an embodiment, these heat transfer circuits correspond to several heat transfer circuits configured to respectively discharge heat diffused by different heat sources of the electrical generator 10 (for example: power electronic components, fuel cells, etc.). According to another embodiment, these heat transfer circuits correspond to branches, mounted in parallel at the set of thermoacoustic engines, of one and the same heat transfer circuit configured to discharge heat diffused by a heat source of the electrical generator 10. The thermoacoustic cores 21a, 21b, 21c, 21d are preferably of travelling wave type.

Figure 6:
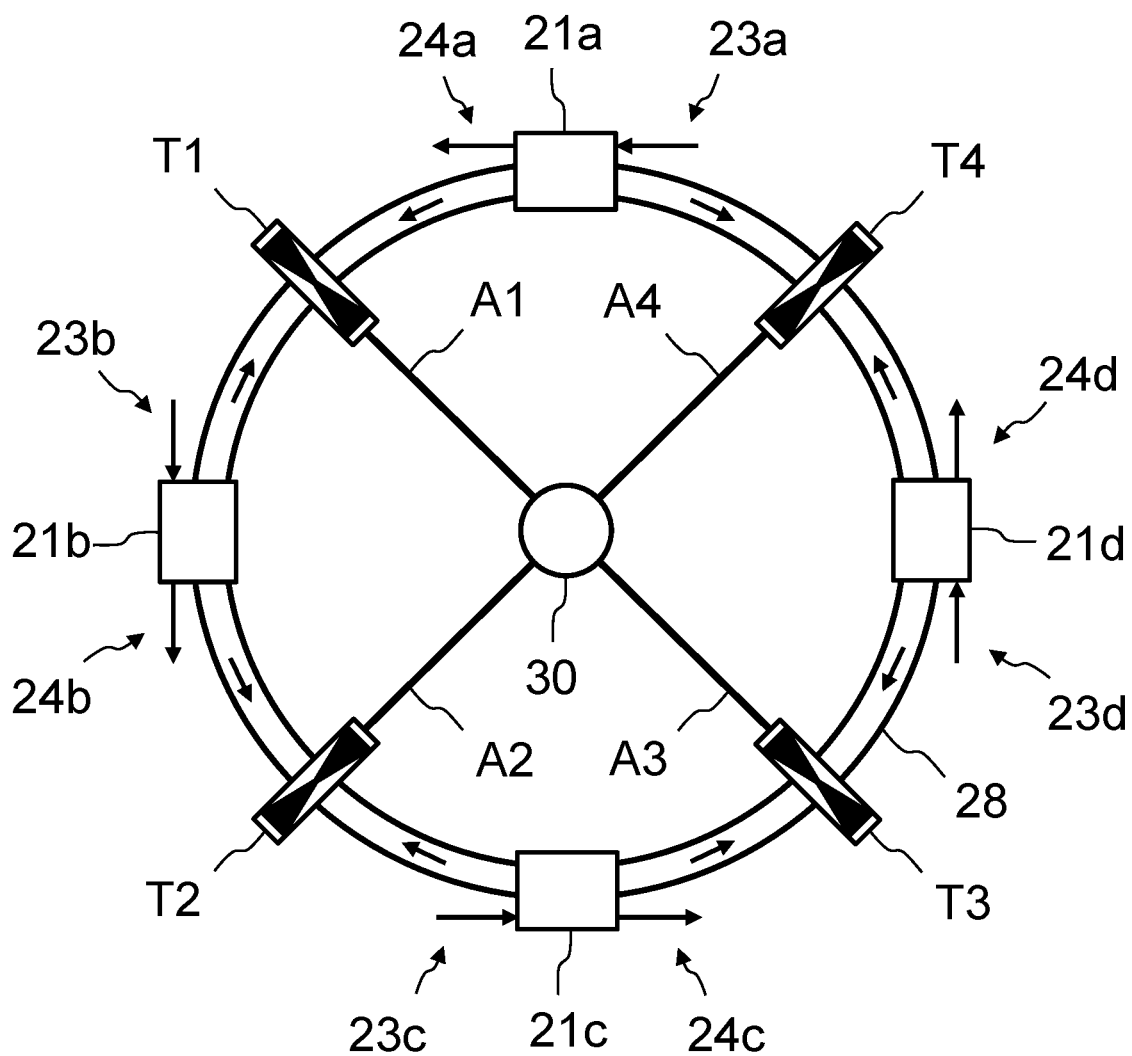
FIG. 6 schematically illustrates an arrangement of four thermoacoustic engines in an electric propulsion system according to an embodiment of the invention.

The operation of the different thermoacoustic cores 21a, 21b, 21c, 21d is similar to that of the thermoacoustic core 21 of FIG. 3. The acoustic waves transmitted by these thermoacoustic cores, an example of which is illustrated in FIG. 6 by arrows in the acoustic duct 28, have the effect of rotationally driving the turbines T1, T2, T3, T4 and, consequently, their output shafts A1, A2, A3, A4. That has the effect of rotationally driving the output shaft of the gearbox 30. The mechanical power available on this output shaft of the gearbox corresponds, within the margins of the efficiency of the gearbox, to the sum of the powers available on each of the output shafts A1, A2, A3, A4 of the turbines. The output shaft of the gearbox 30 is coupled to the cooling device 16 of the electrical generator 10, either mechanically, or electrically via an alternator 32 as already explained with reference to FIGS. 3 to 5 for the output shaft A of a thermoacoustic engine. Coupling several thermoacoustic engines thus makes it possible to harvest more power and therefore energy, from the heat dissipated by the electrical generator 10. That also makes it possible to discharge a first portion of the heat dissipated by the electrical generator 10, more significant than in the case of the use of a single thermoacoustic engine. That is notably advantageous when the quantity of heat to be discharged from the electrical generator 10 is high or when the temperature of the heat transfer fluid is low at the input of the thermoacoustic cores (in the heat transfer ducts 23a, 23b, 23c, 23d). That, for example, allows for a satisfactory operation for a heat transfer fluid temperature at the input of the thermoacoustic cores as low as 80° C.

Figure 7:
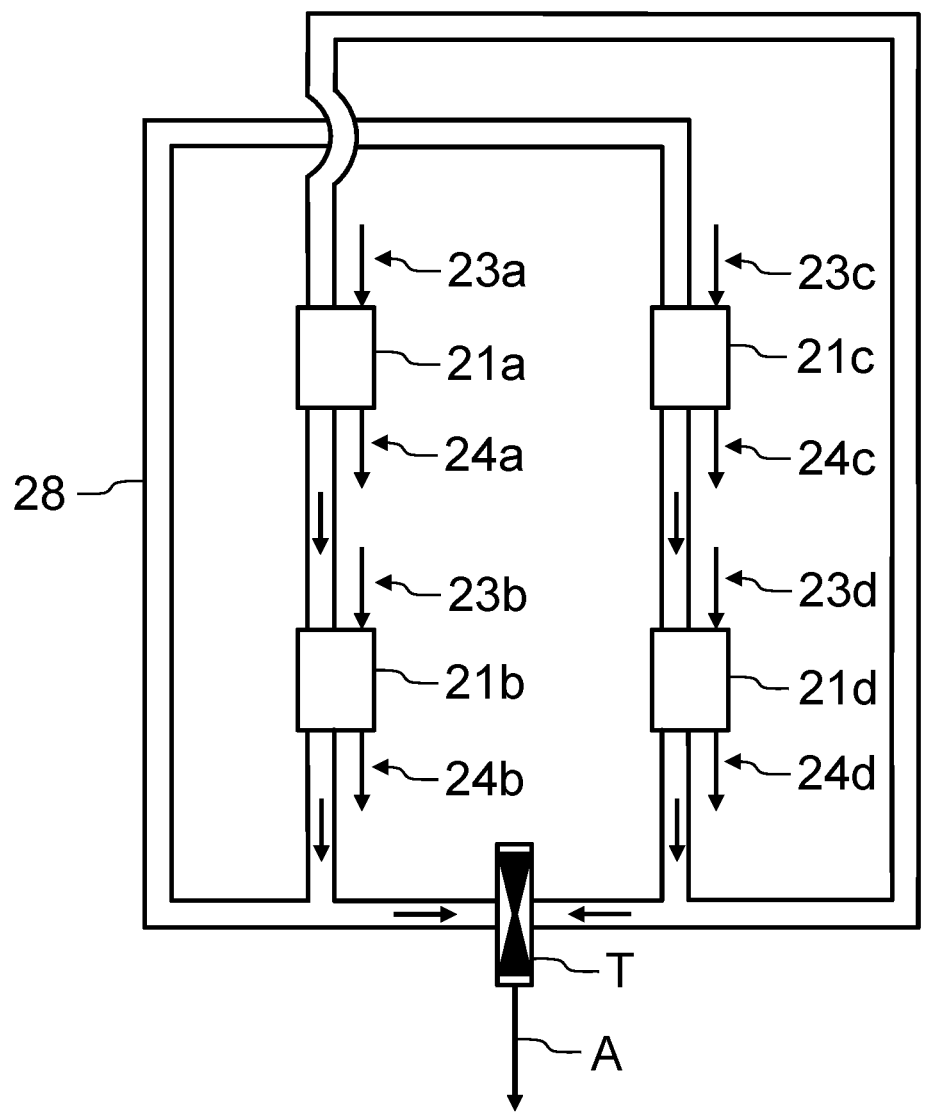
FIG. 7 schematically illustrates another arrangement of four thermoacoustic engines in an electric propulsion system according to an embodiment of the invention.

In another embodiment illustrated in FIG. 7, the thermoacoustic cores 21a, 21b, 21c, 21d of the four thermoacoustic engines are acoustically mounted in series pairwise on a set of acoustic ducts 28 according to a so-called push-pull configuration so as to drive a common turbine T, preferably a bidirectional turbine. The operation of the thermoacoustic cores is similar to that already described with reference to FIG. 6. The acoustic waves emitted by the thermoacoustic cores are illustrated, in a particular example, by arrows in the ducts 28 of FIG. 7. The turbine T thus receives the acoustic waves originating from the set of thermoacoustic cores, which drives the rotation of the turbine and of its output shaft A. The output shaft A of the turbine is coupled to the cooling device 16 of the electrical generator 10, either mechanically, or electrically via an alternator 32 as already explained with reference to FIGS. 3 to 5 for the output shaft A of a thermoacoustic engine. This arrangement of the thermoacoustic cores and of the turbine makes it possible for a single turbine to receive a total acoustic power roughly corresponding to the sum of the acoustic powers generated by the different thermoacoustic cores. The result thereof is a weight saving compared to the embodiment illustrated in FIG. 6, since only one turbine is needed instead of four and, in addition, there is no need to use a gearbox.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An electric propulsion system of an aircraft comprising:
   an electrical generator configured to dissipate heat during its operation,
   a cooling device of the electrical generator,
   the cooling device coupled to a turbine,
   at least one thermoacoustic engine, and
   a heat transfer circuit configured to transport the heat dissipated by the electrical generator to the thermoacoustic engine via a circulated heat transfer fluid, the heat transfer circuit comprising:
      a go duct configured to transfer the heat transfer fluid from the electrical generator to the thermoacoustic engine, and
      a return duct configured to return the heat transfer fluid from the thermoacoustic engine to the electrical generator, and
   wherein the turbine is at least partially rotated by energy from the thermoacoustic engine to at least partially drive the cooling device.

2. The system according to claim 1, wherein the thermoacoustic engine is a travelling wave thermoacoustic engine.

3. The system according to claim 1, wherein the cooling device of the electrical generator is mechanically driven by the at least one thermoacoustic engine.

4. The system according to claim 1, wherein the at least one (Original) thermoacoustic engine drives an alternator provided to at least partially electrically power the cooling device of the electrical generator.

5. The system according to claim 1, wherein the cooling device of the electrical generator comprises a two-phase device comprising a compressor at least partially powered by energy from the thermoacoustic engine.

6. The system according to claim 1, further comprising at least two thermoacoustic engines whose thermoacoustic cores are mounted acoustically in series so as to drive a set of bidirectional turbines.

7. The system according to claim 1, further comprising four thermoacoustic engines whose thermoacoustic cores are mounted acoustically in series so as to drive a set of bidirectional turbines.

8. The system according to claim 1, further comprising four thermoacoustic engines whose thermoacoustic cores are acoustically mounted in series pairwise in a push-pull configuration to drive a single bidirectional turbine.

9. The system according to claim 1, wherein the cooling device is configured to cool power electronic components of the electrical generator.

10. The system according to claim 1,
wherein the electrical generator comprises a set of fuel cells and a cooling circuit of the fuel cells, the cooling circuit containing a coolant, and
wherein the cooling device is configured to cool said coolant.

11. An aircraft comprising an electric propulsion system according to claim 1.

12. The system according to claim 3, wherein the cooling device of the electrical generator is mechanically driven by the turbine of the at least one thermoacoustic engine.

* * * * *